United States Patent

Moe et al.

[15] 3,636,379

[45] Jan. 18, 1972

[54] PHASE CONTROL

[72] Inventors: John L. Moe; Charles H. Russell, both of Winona, Minn.

[73] Assignee: Waynco, Inc., Winona, Minn.

[22] Filed: July 25, 1968

[21] Appl. No.: 747,744

[52] U.S. Cl.........................307/252 F, 307/252 B, 307/262, 328/55, 328/155

[51] Int. Cl.........................................................H03k 17/00

[58] Field of Search..........................307/301, 252, 262, 305; 328/55, 155; 323/24, 34

[56] References Cited

UNITED STATES PATENTS

| | | | |
|---|---|---|---|
| 3,181,009 | 4/1965 | Felcheck | 307/265 |
| 3,406,295 | 10/1968 | Corey | 307/252 |
| 3,487,292 | 12/1969 | Tibbetts | 307/252 |

*Primary Examiner*—Donald D. Forrer
*Assistant Examiner*—David M. Carter
*Attorney*—Richard J. Renk

[57] ABSTRACT

A novel phase control circuit provides wider control range and a greater percentage of power delivered by synchronous switching of a triggering circuit through a unique notched square wave signal. The output of a triggering circuit is then used to actuate a power device in synchronized phased relationship with an AC supply voltage.

1 Claims, 6 Drawing Figures

INVENTOR.
JOHN L. MOE &
CHARLES H. RUSSELL
BY Richard J. Renk
ATTORNEY

INVENTOR.
JOHN L. MOE &
CHARLES H. RUSSELL
BY Richard J. Renk
ATTORNEY

INVENTOR.
JOHN L. MOE &
CHARLES H. RUSSELL
BY
Richard J. Renk
ATTORNEY

PHASE CONTROL

BACKGROUND OF INVENTION

In phase control using conventional AC supply voltages for synchronizing purposes, it is desirable to utilize as much of the voltage sine-wave as possible to provide the widest control range. In other words, use as much of the half wave as possible starting after the wave crosses zero and before it again crosses zero.

In the past, typical applications have used a zener diode across a full-wave rectifier to clip the rounded wave peaks. However this did not provide a true square wave. Instead, a somewhat trapezoidal wave pattern was formed, which because of its shape, utilized a range of approximately 10° to 170° of a typical half-cycle sine-wave.

SUMMARY OF INVENTION

The present invention overcomes the deficiency of the prior phase control concepts by providing an idealized square wave switching circuit with an extremely narrow notch between half-waves to synchronize a triggering device such as a unijunction circuit with an AC power circuit. This has the effect of more fully utilizing the full-wave supply by providing control between the range of approximately 5° to 175° as well as reducing the inherent false triggering noise and transients which occur with prior art devices.

PREFERRED EMBODIMENTS

Figure 1:
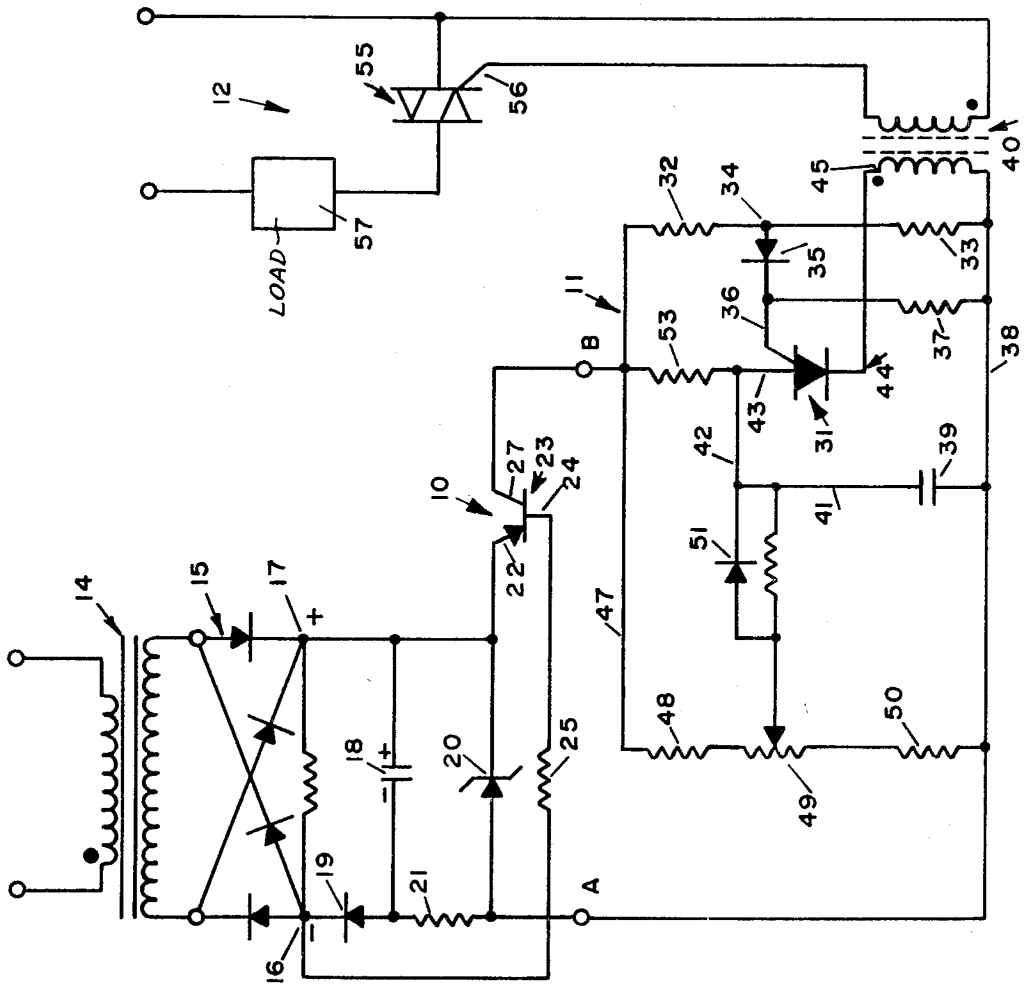
FIG. 1 is a schematic view of one embodiment of the invention.

Referring now to the drawings, one embodiment of the invention is shown in FIG. 1. Basically the circuitry includes a switching section 10, a triggering section 11 and a load section 12.

In this embodiment, the switching section 10 is supplied an AC line voltage 13 (FIG. 2) via a transformer 14. Connected to the secondary of the transformer 14 is a bridge rectifier 15 which provides a full-wave DC output at points 16 and 17. The rectified voltage from points 16 and 17 is applied across a filter capacitor 18 through a diode 19.

The filtered DC from the capacitor 18 is applied to a zener diode 20 through a resistor 21. Zener 20 supplies a regulated DC voltage to the emitter 22 of a switching transistor 23. The base 24 of transistor 23 is driven through a resistor 25 and thence back to the rectified DC supply at point 16.

Whenever capacitor 18 is being charged by the bridge rectifier 15, diode 19 is conducting and acts as a closed switch causing transistor 23 to switch on. When the AC supply voltage from transformer 14 drops to zero as it goes through its zero crossings 26 (FIG. 2), capacitor 18 does not receive current from rectifier 15. The diode 19 then does not have current flowing through it and performs as an open switch preventing any base to emitter current to flow in transistor 23. Thus, transistor 23 is turned off at the zero crossing points 26 of the AC supply voltage 13.

Figures 2, 3, 4, 5:
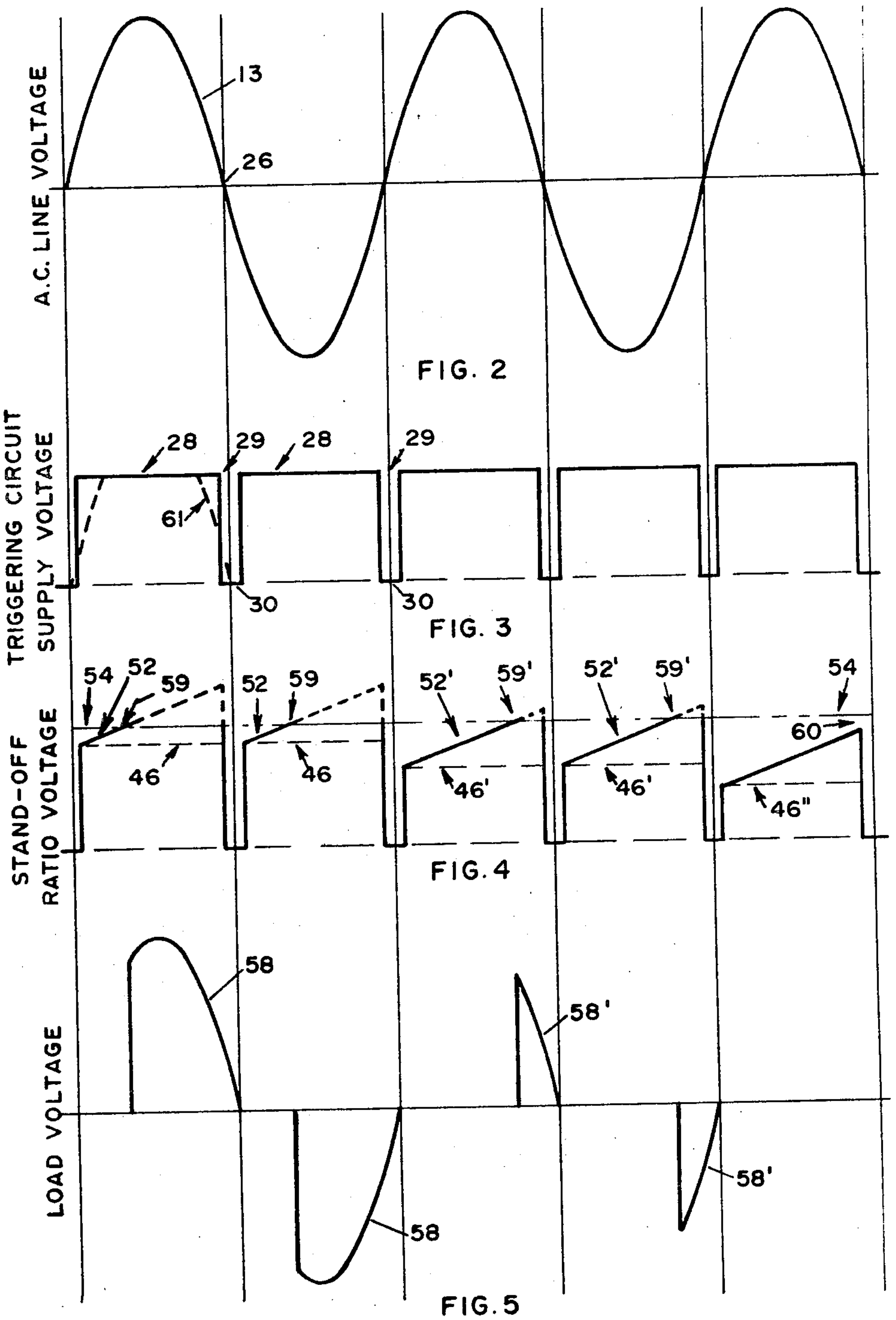
FIG. 2 is a typical AC line voltage waveform.
FIG. 3 is the waveform provided by the novel switching circuit of the invention.
FIG. 4 is the pedestal and ramp voltage waveform provided by a portion of the circuit to actuate a unijunction triggering circuit.
FIG. 5 is the waveform of the power applied to a load as synchronized by the switching and triggering circuits.

Except for the zero crossing points of the AC supply voltage, the voltage across zener diode 20 appears at the collector 27 of transistor 22, or across points A–B (FIG. 1); it will be regulated DC as shown at 28 (FIG. 3). When the AC supply voltage approaches the zero crossings 26, there will be a notch or hole as at 29 (FIG. 3) cutout of the voltage appearing across points A–B and the latter will drop to zero as at 30 (FIG. 3).

In accordance with the invention, it is this notch 29 in the DC voltage across points A and B which is used to synchronize and control the triggering section 11 (FIG. 1) and subsequently synchronize the power applied to the load 12 with the AC supply.

As shown in FIG. 1, the triggering section 11 is connected across points A and B. Specifically, in this instance, there is provided a programmable unijunction transistor (PUT) 31 with the standoff ratio therefore being established by voltage dividing resistor 32 and 33. The resistors 32 and 33 are connected at their common junction 34 to a diode 35 which in turn is connected to PUT gate 36. Temperature compensation for the circuit is provided by the diode 35 and a resistor 37 tied between the gate 36 and a common conductor 38.

Pulse power is supplied by a capacitor 39. The output of capacitor 39 is coupled through the PUT 31 to a pulse transformer 40. This is accomplished via conductors 41 and 42, PUT anode 43 and cathode 44 to pulse transformer winding 45 and thence back through common conductor 38 to the capacitor 39.

Charging of the capacitor 39 is accomplished via two paths. A fast or pedestal charging current 46 (FIG. 4) is supplied to the capacitor from point B through conductor 47 and a network of resistors 48, 49 and 50 and thence via diode 51 to conductor 41. This charge is very fast, in the nature of a millisecond, and is determined by the setting of the variable resistor 49 which may be a potentiometer or the like.

A second source of charging current, namely a linear or ramp current 52 (FIG. 4), is supplied the capacitor 39 from point B through a resistor 53 (FIG. 1) and thence through conductors 42 and 41. The ramp source 52 adds equal increments of voltage to capacitor 39 as a function of time.

As shown in FIG. 4, whenever the pedestal voltage 46 or 46', etc., plus the ramp voltage 52 or 52' etc., increases the voltage on capacitor 39 to a point where it reaches the standoff ratio voltage indicated by line 54 (FIG. 4) appearing across the voltage divider 32–33, the PUT 31 will switch on. This will cause capacitor 39 to discharge rapidly through PUT 31 and pulse transformer 40.

Pulsing of transformer 40 will then actuate a power-switching device in the power section 12 such as triac 55. In this embodiment, a pulse is applied to the gate 56 of the triac 55. Power from the AC supply will then pass through the triac to a load 57. As shown in FIG. 5, once the triac is fired it will conduct and supply power to the load through the remaining portion of the AC cycle as indicated at 58, 58', etc. At the zero voltage point of the AC supply, the triac 55 will shut off and will not conduct until the PUT 31 is again triggered.

The point on the AC line voltage curve at which the PUT 31 and triac 55 will be triggered can be varied by changing the setting of the potentiometer resistor 49. This determines the magnitude of the pedestal voltage as indicated by the numbers 46, 46' and 46'' in FIG. 4. Consequently it determines the elapsed time it takes before the pedestal voltage when added to the constantly increasing ramp voltage, to bring the capacitor voltage to the standoff ratio 54 and the point of discharge indicated by numerals 59, 59', etc.

As shown in FIG. 4, if the pedestal voltage 46 is below the standoff ratio voltage 54, firing will not occur until the ramp voltage 52 gradually increases along the sloped line crosses the standoff ratio voltage at points 59 or 59'. On the other hand, if the combined ramp and pedestal voltages never reach the standoff ratio voltage 54 as shown at 60 in FIG. 4, the PUT 31 and triac 55 will not fire at all. Thus, no power will be supplied to the load 57 as evidenced by the absence of load voltage appearing in FIG. 5. Conversely, if the pedestal voltage 46 alone is equal to or in excess of the standoff ratio voltage 54, the PUT 31 will fire immediately upon receiving the triggering supply voltage from transistor 23.

From the above, it will be clear that the whole circuit, from the switching of transistor 23 to the actuation of the load triac 57 is synchronized with the AC supply voltage. Because of the very narrow notch 29 in the switching circuit voltage 28, the control range of approximately 5° to 175° is wider than previous phase control circuits where the range is in the nature of 10° to 170°. In other words, a greater portion of the AC wave can be utilized with more stability.

Heretofore, for example, some previous phase control circuits employed a rectifier with a zener to clip the AC wave as shown by the dotted lines 61 in FIG. 3. Circuits of this type, because of their slope, did not utilize the largest possible range or period of the AC line voltage. Moreover, such circuits were susceptible to line noise and transients which aided in generating false triggering signals for the unijunction during the notch period when the circuit was in the high impedance state.

Figure 6:
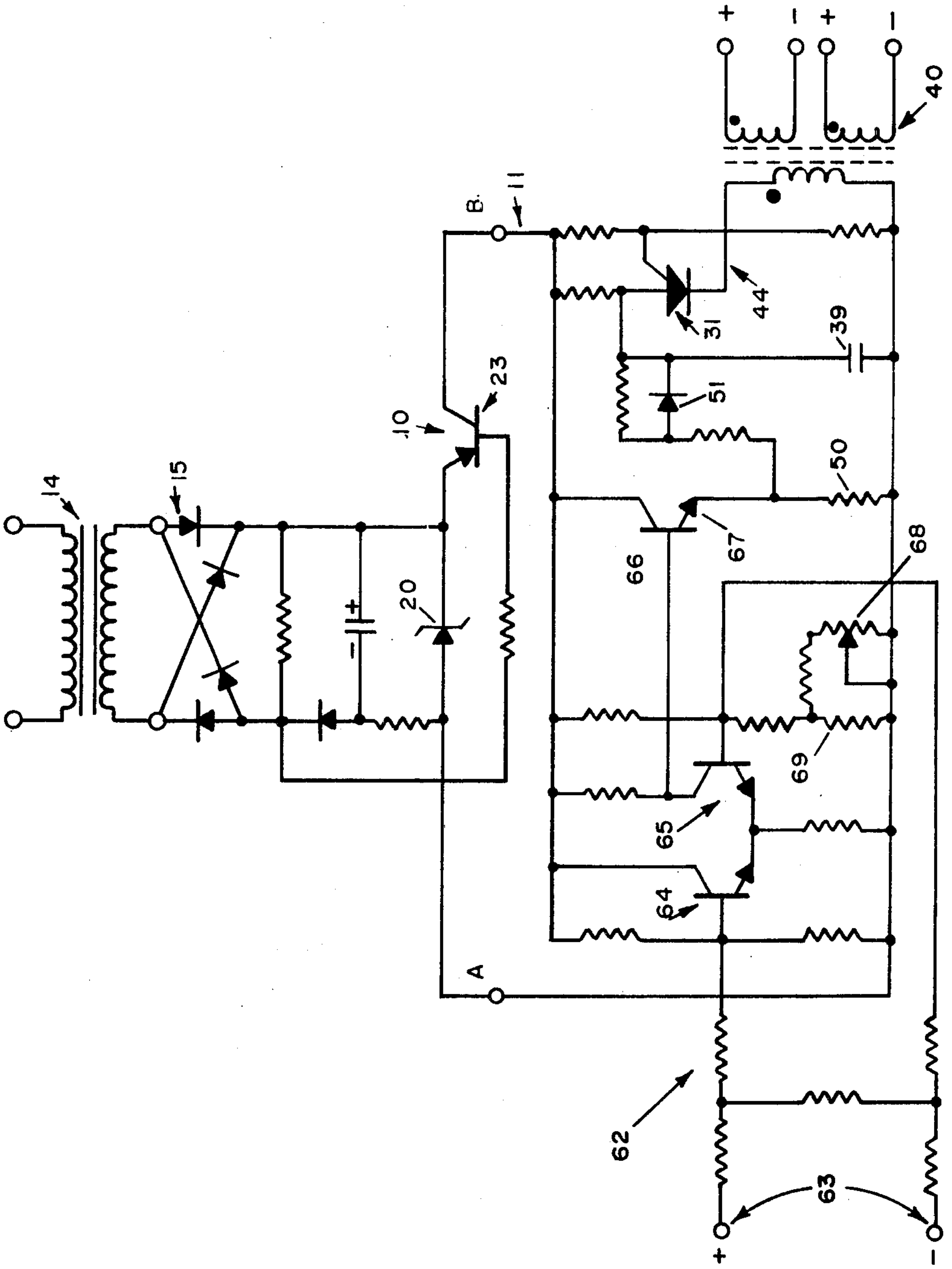
FIG. 6 is a diagram of another embodiment of the invention.

A further embodiment of the invention is shown by the circuit of FIG. 6. For purposes of illustration, parts having the same function as those of the embodiment shown in FIG. 1 are indicated by the same numbers.

Specifically, the embodiment of FIG. 6 uses an electrical input signal circuit 62 as a means of adjusting the pedestal voltage 46 instead of using the manually adjustable potentiometer 49. The input signal circuit 62 includes a DC input source 63, a difference amplifier including transistors 64 and 65, and an emitter follower circuit including a transistor 66. The output voltage from emitter follower transistor 66 through its emitter 67 is coupled to the diode 51.

Thus, an electrical input signal applied at 63 provides the variation in pedestal voltage 46 to determine how much pedestal voltage will be applied to capacitor 39 and thereby determine how soon the standoff ratio will be reached to switch on the power section 12. In this embodiment the pulse transformer 40 is shown with two windings which may be connected to two SCR's connected back-to-back serving as the power section.

In use, the circuit of FIG. 6 may be used in conjunction with a temperature controller. The output of a sensor circuit is coupled by well-known means to the input section 63. With this circuit, the larger the error signal applied to section 63, the more transistor 64 will conduct thereby increasing the magnitude of the pedestal voltage and increasing the length of time that AC power is applied to the load through the power switching circuit.

For purpose of adjustment, a potentiometer 68 is shunted across a biasing resistor 69 for transistor 65. Potentiometer 68 provides a zero or reference point for the entire circuit. For example, the control can be used to provide zero output for zero input, or, zero output for a given input.

It is of course within the purview of the invention to use other devices in the switching section such as a vacuum tube device instead of the transistor 23; to use gaseous discharge devices such as the regenerative type in the triggering section instead of the PUT; and to use other power devices instead of the triac 55 such as the pulse type like the ignitron, firetron, vacuum tube, etc.

Moreover, while the preferred embodiments of the invention have been shown, other variations may be resorted to and still be within the scope of the following claims:

What we claim is:

1. A phase control circuit comprising:

a. an AC supply voltage;

b. a triggering circuit including means for supplying a pedestal voltage and means for automatically varying the pedestal voltage, said latter means including a difference amplifier having its input adapted to be coupled to a DC signal input, switching means coupled to the output of said difference amplifier with the output of said switching means being coupled to said means for supplying the pedestal voltage;

c. a power control circuit coupled to said triggering circuit; and a d. switching circuit for actuating said triggering circuit providing a substantially square wave output voltage to said triggering circuit synchronized with said AC supply voltage.

* * * * *